Nov. 11, 1969    L. S. MOBLEY    3,477,705
STEEL MAKING APPARATUS
Original Filed July 6, 1964    2 Sheets-Sheet 2

INVENTOR.
LORELEY S. MOBLEY.

BY MELVILLE, STRASSER, FOSTER & HOFFMAN
ATTORNEYS.

ID
3,477,705
STEEL MAKING APPARATUS

Loreley Spencer Mobley, Franklin, Ohio, assignor to Dravo Corporation, Pittsburgh, Pa., a corporation of Pennsylvania
Original application July 6, 1964, Ser. No. 380,285, now Patent No. 3,331,681, dated July 18, 1967. Divided and this application Feb. 28, 1967, Ser. No. 619,304
Int. Cl. C21c 5/46; F27b 19/04
U.S. Cl. 266—13                                                     5 Claims

ABSTRACT OF THE DISCLOSURE

An apparatus for oxygen refining of steel utilizing a succession of mobile furnaces movable along a trackway, each furnace having a flue at each end for communication with the flue of an adjacent furnace, the roof of each furnace having an oxygen lance port and a charging opening, each furnace being rotatable about its longitudinal axis. Along the trackway are positioned a scrap loading station, a scrap preheating station, and an oxygen lance station, the preheating station having a movable duct for connection with the rear flue of a furnace having its forward flue communicating with the rear flue of a furnace at the adjacent oxygen lance station for preheating the charge in the furnace at the preheating station.

CROSS-REFERENCE TO RELATED APPLICATION

This application is a division of copending application Ser. No. 380,285, filed July 6, 1964, now Patent No. 3,331,681, by the same inventor entitled "Steel Making Apparatus and Method of Operating the Same."

This invention is for a steeel making apparatus and method and is especially applicable to the manufacture of steel using oxygen in the refining stage, but does not exclude at some stage in the refining process the use of other gases.

It is well-known in the manufacture of steel by what is termed the basic oxygen process to charge scrap and molten metal into a refractory-lined vessel and to then melt down and refine the charge through the use of an oxygen lance which directs a stream of oxygen against the bath of molten metal and overlying slag, thus parting the overlying layer of slag and exposing the underlying surface of the metal directly to the stream of oxygen. By this operation carbon and oxidizable impurities are reduced or eliminated. The reaction is rapid and generally violent while the "off gas" from the vessel is comprised largely of CO. The vessel or furnace is for this reason positioned under a hood where the CO is oxidized to $CO_2$ and the heat wasted, or sometimes used for the generation of steam.

While this process is extensively employed, it presents certain economic drawbacks. One important objection is that there must be two furnaces so that one may be relined and/or repaired while the other is in use. Thus, with a multi-million-dollar investment, 50% of the apparatus can only be productively used at any one time. Another drawback arises from the fact that while the actual blowing time may be about twenty minutes, about the average minimum time for completion of one cycle from one charging to a succeeding charging is around 45 minutes. Other objections arise from the extensive floor or ground area necessary for such a plant and that the repair of one furnace must take place in the same work area where the furnace operations are being conducted.

While the scrap part of the charge is generally cheaper than the molten metal part, the conventional practice above referred to requires the use of a substantially large percentage of molten metal to scrap, since the heat for melting down the scrap must be derived from the molten metal and the heat generated by reaction of oxygen with carbon and other oxidizable components of the molten charge.

In the proposed use of continuous casting of the molten steel into billets or slabs, the casting is best effected while the temperature of the metal is high, which indicates the desirability of the casting unit being close to the furnace, whereas to utilize the heat in the continuously-cast billets or slabs, it is desirable that the casting unit be near the metal rolling facility. Few plants are so organized that the casting unit may be near both the furnace and the rolling mill end of the operation.

The present invention provides a facility and method where, through the use of a succession of similar furnace units, more effective use is made of the equipment with a consequent greater yield from a smaller investment. It contemplates the use of a number of mobile furnace units with a plant so organized that while one furnace is on the blowing cycle, a succeeding furnace is being preheated from the off gases of the one ahead and at the finish of the preheat, charged with molten metal. A third succeeding furnace may at such time be receiving a charge of cold scrap, while a heat which has just been finished is transported to a pouring station and emptied with less loss of heat in the finished metal which is now involved in the present practice of pouring the finished steel from the furnace to a ladle and the transportation of this ladle to a place where the metal is to be poured. There is desirably still another mobile furnace which may be at a repair and/or relining station remote from the blowing, preheating and scrap charging areas so that relining in no way uses space in the metal refining area. The advantages of this method and apparatus will hereinafter become more fully apparent.

The invention has for its primary object to provide a new and unique steel making facility and method.

A further object is to provide such a facility and method which, among other things, will involve less investment per ton capacity, utilize more fully the off gases from the oxygen blowing operation, have greater flexibility, and utilize less ground area.

These and other objects and advantages will become apparent from the following detailed description in conjunction with the accompanying drawing, in which.

Figure 2:
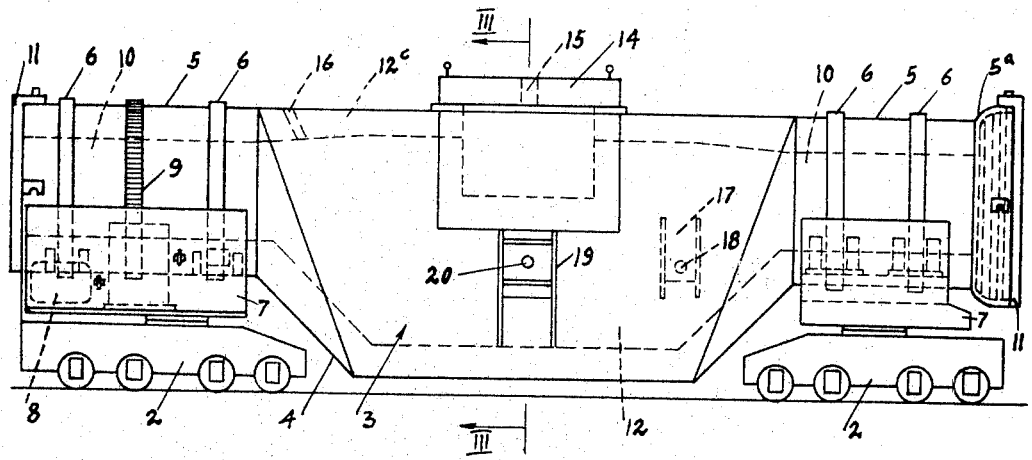
FIGURE 2 is a side elevation of one of the mobile furnaces.
Figure 3:
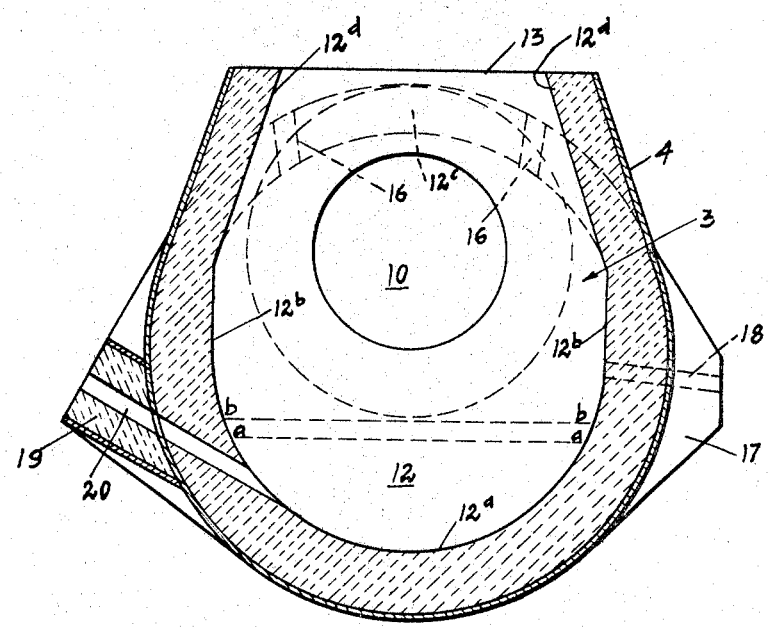
FIGURE 3 is a transverse vertical section through the furnace structure apart from the car, the view being substantially in the plane of line III–III of FIGURE 2.

Referring first to FIGURES 2 and 3, 2 designates rail trucks at each end of the furnace which is designated generally at 3. The furnace comprises a steel shell 4 having cylindrical end portions 5. These are encircled by tires or rings 6 for support in a well-known manner similar to rotary kilns on fixed rollers mounted in cradle structures 7 that are pivoted on the truck 2. A reversible motor at 8 is utilized through gearing and a ring 9 with gear teeth thereabout to rotate the furnace about its axis. The shell is lined with refractory and the end portions 5 are hollow, providing axially-extending tubular ducts or flues 10. The cylindrical extension at one end, preferably at the rear, has a bell mouth 5a into which the opposite end of a succeeding similar furnace unit may be entered for the transfer of off gases from the unit ahead to the following one, or from a second furnace to an offtake duct, as will hereinafter more fully appear. As here shown in FIGURE 2, removable cover plates 11 may be hung over the ends of the flues.

The body of the furnace between the cylindrical ends is non-symmetrical about the axis of rotation of the furnace, with a deeper metal holding receptacle or hearth portion 12 which has a rounded substantially semi-circular bottom 12a that is curved about a point lying close to the bottom edge of the flue passage 10 so that it is eccentric to these passages. It has tangential side walls 12b extending up from the curve that join into an arched top wall 12c. The hearth portion or metal holding part of the furnace is thus underslung between the trucks on which the furnace rides and is below the level of the flues 10.

At the middle of the furnace there is a charging opening 13 which is formed by replacing the curved top with upwardly convergent flat side walls 12d extending from the side walls 12b to a level slightly above the roof or top wall 12c, the opening 13 as here shown being substantially square. In FIGURE 2 I have shown a refractory cover block 14 removably set over this opening, the block having a central opening 15 therethrough.

In the roof, at the forward or left-hand end of the furnace as viewed in FIGURE 2 and just inwardly from the cylindrical end part 5, there are one or more, preferably two, ports 16 that are preferably inclined downwardly and toward the middle of the furnace. With two ports 16 as shown, they are in transverse alignment and one is on each side of the longitudinal center line of the roof.

On the side wall of the furnace between the charging opening and the cylindrical portion 5 at the other end of the furnace from the lance ports 16, is a later protuberance 17 through which is a slag discharge port 18, this port being at a level just below the mid plane of the furnace chamber and it slopes outwardly and downwardly at a slight angle.

On the side of the furnace body opposite from the slag port there is a metal pouring spout 19 with a passage 20 therethrough that extends outwardly and upwardly at a tangent to the bottom of the furnace at about its lowest point. This spout is desirably located about the middle of the furnace from end to end.

The charge of molten metal at the time of blowing with oxygen is at the general level of the dotted line a—a, and above this are a few inches of slag represented by the dotted line b—b. As viewed in FIGURE 3 the furnace is rotated in a clockwise direction from the upright position as hereinbefore explained through an arc of about 17° which will enable the slag to discharge from port 18 (protuberance 17 and port 18 being shown in FIG. 3 to illustrate the relative positioning thereof even though not properly includable in this sectional view). When the metal is to be taken from the furnace, the furnace is rotated in the opposite direction from a vertical position through an arc sufficient for the metal to substantially entirely flow from the bottom of the furnace through port 20. Until the respective pours are to be effected, the ports are plugged with a temporary plug which may be lanced open.

Figure 1:
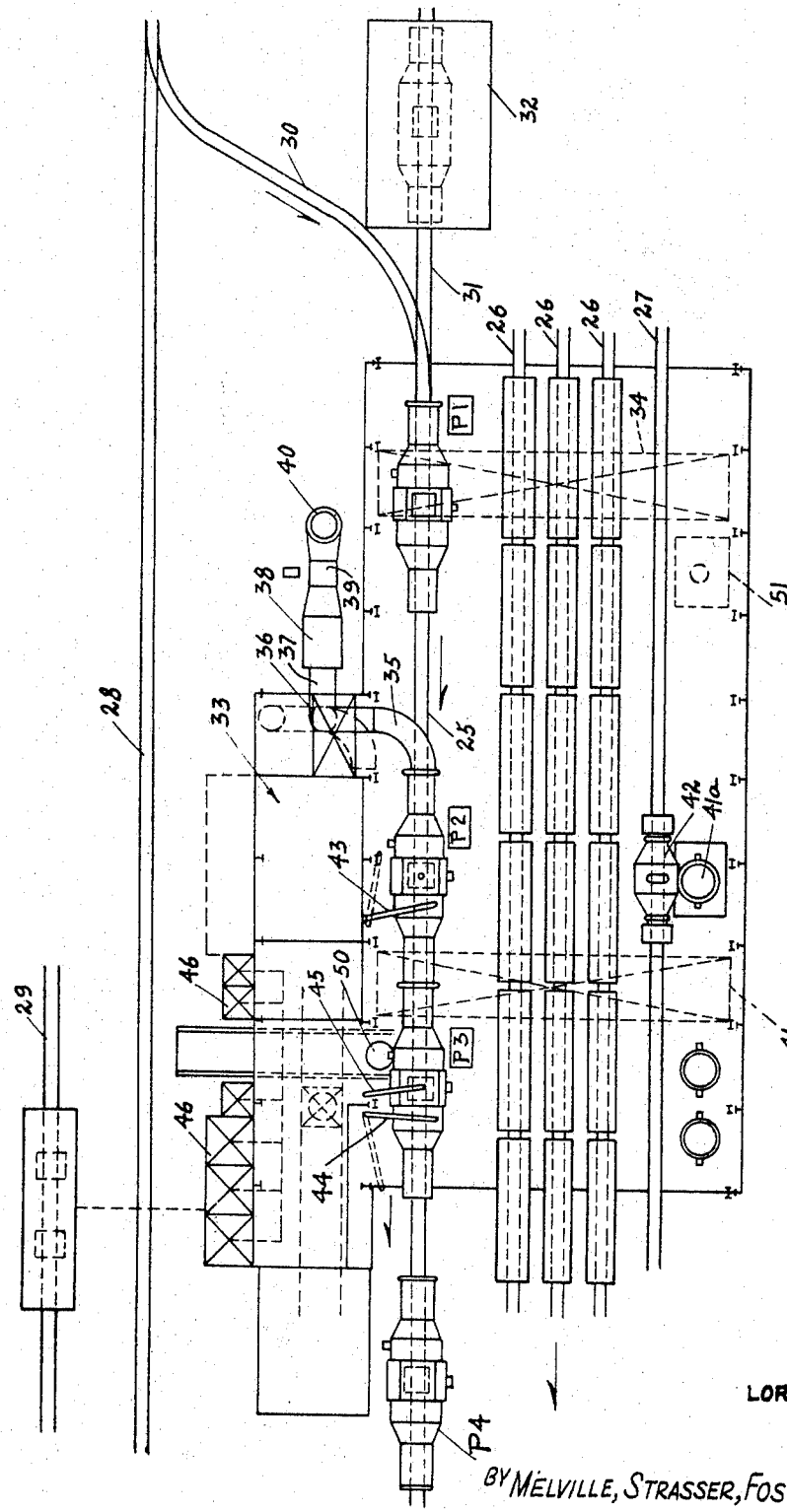
FIGURE 1 is a general plan view of a plant embodying my invention and for the practice of the method.

A steel making facility embodying the present invention employs several of these mobile furnace units. FIGURE 1 shows more or less schematically one plant layout for this purpose. There is a main track 25 along which the furnace units are intermittently progressed in the operating cycle. There are one or more, preferably three, scrap car tracks 26 at one side of the main track; the number of scrap car tracks, however, will vary with the available plant area and the rated capacity of the plant. There is a hot metal car track 27 alongside the outermost scrap car track. There is a furnace return track 28 located to some distance to the other side of the main furnace track, and there may be still another track 29 parallel with this for cars for addition materials used in the steel making process. A cross-over track 30 is utilized to return the furnace units to the main track and a switchback 31 enables the furnaces to be moved back along the main track to a repair station 32 where the refractory is fettled, repaired or replaced, or other service operations performed.

Alongside the main track is the working area or shop designated generally at 33. There is a first station or position P1 at which there is an overhead traveling bridge crane schematically indicated at 34. It is a conventional structure, spanning the main track, the scrap car tracks and the hot metal car track with an electro-magnetic lift that may be lowered into a scrap car, pick up a load of scrap metal and deposit it in the charging opening of a furnace at this station. There may be a railroad scale at the scrap charging station, or the scrap may be weighed by a scale arrangement on the crane, both of which arrangements are known. When the charge of scrap has been loaded into a furnace, a cover block 14 is put in place over the charging opening.

While the cold charge is being loaded into the furnace at station P1, there may be another furnace ahead of it at station P2, while ahead of this is a third furnace at station P3, this being the oxygen blowing station, and is located immediately ahead of the preheat station, so close in fact that the cylindrical forward end 5 of the furnace at the preheat station P2 is entered in the bell 5a at the rear end portion 5 of the furnace at the blowing station.

At the preheat station there is a duct 35 that is suspended at 36 so that it may be retracted clear of the track to permit the furnaces to be successively moved from the scrap charging station to station P2 and this duct is then entered into the bell at the rear end of the furnace at the preheat station. This duct is an extension of pipe 37 leading to a gas cleaner 38 and the gas cleaner is followed by a suction fan 39 which discharges into a stack 40. By this arrangement, hot off-gases from the furnace ahead at station P3 are drawn through the scrap in the furnace at station P2.

At station P2 there is also a traveling bridge crane 41 extending over the main track, the scrap car tracks and the hot metal track. This crane serves to carry a ladle 41a of molten metal which is poured into it from a hot metal or so-called bottle car 42 on the hot metal track 27 and pour it into the furnace at station P2. The ladle 41a rests on a scale while it is being charged with molten metal, as is usual, so that the molten metal can be weighed, since it is important that the weight of both the scrap and the metal be known. The metal in the ladle is only poured into the furnace after the scrap therein has first been heated by the off-gases from the furnace at P3, and of course after first removing the cover 14. As a matter of fact the preheating of the scrap may melt out small amounts of "tramp" metals as lead, brass, solder, copper, etc., that may be present in a free state in certain types of scrap, and the furnace can be tilted to remove any such molten tramp metals that have accumulated before the hot ferrous metal is introduced into the furnace from the ladle.

At station P2 there may be a crane 43 with a lance that can be entered into one of the ports 16 of the furnace at this station for supplying air, oxygen, or auxiliary fuel gas, depending upon operating conditions. Such a crane is not per se of novel construction.

At station P3 there is a similar crane or support 44 for lances to be entered into the opening or openings 16 for blowing oxygen onto the charge in the furnace at this station. After the hot metal has been poured into the furnace at station P2, the cover block 14 is replaced over the charging opening. At station P3 there is another swiveled duct supported on a crane schematically indicated at 45, which may be entered into the opening 15 in the cover block 14. This is for the purpose of supplying addition materials from any one of the several bins 46 to the interior of the furnace at station P3 during the progress of the blow. It is desirable to transport these addition materials by a pneumatic conveyor, but any suitable conveyor may be used.

During the blowing cycle a removable cover plate 11 as previously described, is placed over the forward end of the furnace at station P3 and at the same time the duct 35 is entered into the bell 5a at the rear end of the furnace at station P2.

A power-operated car puller (not shown) is desirably used in the shop section 33 for moving the furnace units from station to station in accordance with the operation previously described. After the blowing cycle has been completed, the furnace at station P3 is first tilted to discharge slag into a transversely-movable ladle 50 and is then moved out of the blowing position and if the metal is not to be immediately poured, a cover plate 11 may be placed over the rear end of the furnace to conserve the heat until the pouring is to take place. It may also be desirable at times to pour off the slag into ladle 50 intermediate to the beginning and end of the blow, and this may be done and new slag-forming materials introduced through the pneumatic conveyor 45. At the proper stage, alloying or other addition materials may also be selectively introduced through 45 from any one of the bins at 46. When the blowing operation on the furnace P3 has been completed and the furnace moved ahead on the track 25 such as indicated at P4 in FIGURE 1, the succeeding furnace units are moved ahead, a new furnace being brought into the station at P1 to be charged with scrap and the other furnaces all advanced one station, after which the cycle is completed.

At 51 there may be an emergency re-ladling pit alongside the hot metal track 27 in which is a ladle for receiving molten metal should an emergency need arise, as for example some failure of the bottle car.

If desired the car at P4 can be moved to a degassing station, or it can be moved to an ingot pouring station, or if the apparatus is to be used in connection with continuous casting, it can be moved to a continuous casting unit that may be remote from the refining apparatus and in the vicinity of the rolling mill. Heat at this time is conserved by reason of the fact that the hot metal does not have to be poured at the steel-making plant into another receptacle and transported in such other receptacle to the casting plant.

In the blowing process oxygen is discharged through the lances entered in the ports 16 against the charge in the furnace to effect the basic oxygen conversion of the metal to steel as is well understood in the art. The off-gases from this reaction are comprised principally of carbon monoxide at high temperature. In the operation of the present method these off-gases are drawn into the furnace at the preheat station P2 where they impinge upon the scrap, preheating it to a high temperature. Usually it becomes hot enough during the preheating cycle that it will tend to soften and sink down of its own weight toward the bottom of the furnace. It may even be desirable at the start of the preheating to tilt the furnace on its side and then bring it gradually to an upright position, thereby causing the charge of scrap to shift and exposing it more effectively to the gases flowing through the furnace.

From the foregoing description it will be evident that steel is being produced almost continuously, first in one furnace and then in succession in others. While each furnace may be smaller than large basic oxygen furnaces presently in use, the non-blowing time from one cycle to the next is shorter.

This plant may be installed in areas that will not accommodate the conventional equipment now in use and only a relatively small part of the total area need be enclosed. It is flexible to the output requirements of the mill, and even permits successive heats to be made to different specifications with little difficulty.

While it has heretofore been proposed to convert an open hearth furnace into two compartments and utilize the off gases from one compartment to preheat the charge in the other, this does not avoid the delay incident to such operations as furnace repair or relining, scrap charging, the need for rehandling scrap and the heat losses which occur when the refined steel in one compartment is being poured during which the preheated metal in the other cannot be blown.

It is an important advantage of the present invention that because of the effective preheating of the scrap with minimum loss of time between the charging of the molten metal and the subsequent blowing cycle that this procedure will enable about 45% of the total charge to be scrap, as against a present maximum of about 25% to 30% in top blown vessels.

There are numerous other advantages, not the least of which is the ability to have refractory and other repair crews removed some distance from the metal processing area where the maintenance crews and the operating personnel are well out of the way of each other. Another advantage is the elimination of very heavy concrete foundations necessary for the support of the basic oxygen furnaces now in use.

While I have shown and specifically described one plant embodying my invention and a desirable furnace unit, it will be understood that this is by way of illustration and that the plant arrangement, and arrangement of tracks will vary according to the requirements of available space and various changes and modifications may be made within the contemplation of my invention, except as limited by the claims.

The embodiments of the invention in which an exclusive property or privilege is claimed are defined as follows:

1. A metallurgical apparatus comprising a trackway; a succession of mobile metallurgical furnaces movable along the trackway, each furnace having a flue at each end adapted to align and communicate with the flue of an adjacent furnace, each furnace having a roof with an oxygen lance port therein, and each furnace being rotatable about its longitudinal axis for the removal of slag and molten metal therefrom; and metal processing apparatus along said trackway comprising an oxygen lance station with an oxygen lance movable into and out of the lance port in said furnace roof, a preheating station adjacent the oxygen lance station having a movable duct for connection with the rear flue of a second furnace having its forward flue communicating with the furnace at the oxygen lance station for preheating a charge in the second furnace, a loading station preceding the first two stations, and means at said loading station for loading a third furnace while furnaces are at the first two stations.

2. The apparatus claimed in claim 1, in which there is a second trackway parallel with the first trackway for scrap carry cars, a third trackway parallel with the second trackway along which a hot metal carrying car may be moved, a crane at the loading station for transferring scrap from a scrap car on the second trackway to a furnace at the loading station, a ladle station along the third trackway for receiving hot metal from the hot metal car, and a crane at the preheating station for transferring the ladle from the ladle station to the furnace at said preheating station.

3. The apparatus claimed in claim 2, including conveyor means at the oxygen lance station for introducing addition ingredients into the furnace at said station.

4. The apparatus claimed in claim 1, wherein each said furnace has a cylindrical end portion at each end concentric with said longitudinal axis of rotation, said cylindrical end portions providing said flues.

5. The apparatus claimed in claim 4, wherein one only of said cylindrical end portions on each furnace has a bell mouth adapted to receive temporarily the opposite end portion of a similar furnace for the transfer of gases from one furnace to another.

References Cited
UNITED STATES PATENTS

| | | |
|---|---|---|
| 456,516 | 7/1891 | Manhes. |
| 810,301 | 1/1906 | Von Philp. |
| 1,251,282 | 12/1917 | Pugh _____ 266—39 |
| 3,013,789 | 12/1961 | Sayre et al. |
| 3,301,664 | 1/1967 | Hall _____ 266—34 X |

J. SPENCER OVERHOLSER, Primary Examiner

J. S. BROWN, Assistant Examiner

U.S. Cl. X.R.

266—36